United States Patent Office 3,824,074
Patented July 16, 1974

3,824,074
HAIR DYE COMPOSITIONS CONTAINING SALTS OF MORPHOLINO(2,3-b)PHENOXAZONIUM
Andree Bugaut, Boulogne-sur-Seine, and Monique Laudon, Gagny, France, assignors to Societe Anonyme dite: L'Oreal, Paris, France
No Drawing. Filed July 23, 1971, Ser. No. 165,740
Claims priority, application Luxembourg, July 31, 1970, 61,452
Int. Cl. D06p *3/04*
U.S. Cl. 8—10                    12 Claims

ABSTRACT OF THE DISCLOSURE

Salts of morpholino-(2,3-b)phenoxazonium are incorporated into hair dye and hair setting lotion compositions.

---

The present invention relates to salts of morpholino-(2,3-b)phenoxazonium having the formula

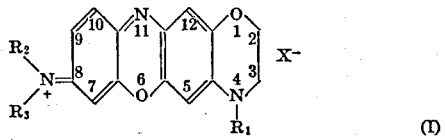

wherein $R_1$ is selected from the group consisting of hydrogen and lower alkyl having 1–4 carbon atoms, $R_2$ and $R_3$ each independently are selected from the group consisting of alkyl having 1–4 carbon atoms, hydroxyalkyl having 1–4 carbon atoms, carbamylalkyl having 1–4 carbon atoms, ω-aminoalkyl having 1–4 carbon atoms, and ω-aminoalkyl having 1–4 carbon atoms wherein the amino moiety is acylated with a monocarboxylic organic acid having the formula R'—COOH wherein R' is selected from the group consisting of alkyl having 1–4 carbon atoms and phenyl or wherein said amino moiety is mono- or di-substituted with alkyl having 1–4 carbon atoms, or wherein the nitrogen of said amino moiety is included in a heterocycle selected from the group consisting of morpholinyl and piperidinyl, and $X^-$ represents a member selected from the group consisting of $Cl^-$, $Br^-$, $ClO_4^-$, and $Cl_3Zn^-$, it being understood that these salts can be present in a tautomeric form of that represented by the above formula and that in the case in which $R_2$ or $R_3$ represents an ω-aminoalkyl, the amine function can be salified by an acid having the formula HX wherein X has the meaning given above.

The above compounds can be obtained in accordance with two methods using as initial reactants (a) a substituted paranitrosoaniline having the formula:

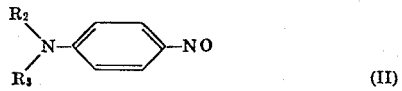

and (b) a 6-hydroxy phenomorpholine having the formula:

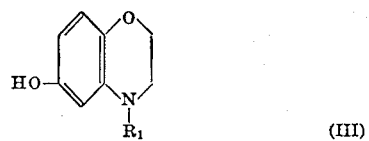

wherein $R_1$ to $R_3$ have the meanings indicated above.

According to a first method of preparing the compounds of this invention equimolecular amounts of a paranitrosoaniline of formula (II) and of a 6-hydroxy phenomorpholine of formula (III) are heated under reflux in absolute ethanol, in the presence of an excess of anhydrous zinc chloride. The product obtained is a double zinc and indamine chloride having the formula:

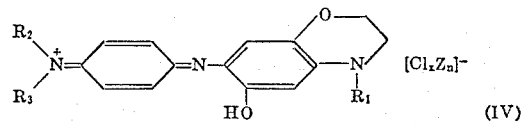

which is separated from the reaction mixture by filtration. Generally, the reaction is effected at ambient pressure and the anhydrous zinc chloride is present usually in amounts ranging from about 1 to 1.5 mole per mole of paranitrosoaniline or phenomorpholine.

This compound of formula (IV) is, after isolation and washing in an alcohol such as a lower alkanol, cyclized by reflux heating in a mixture of dimethylformamide and acetic acid, the development of the reaction being followed by chromatography. Once the cyclization is completed, the reaction mixture is diluted in water and thereafter, filtered. Acid having the formula XH wherein X has the meaning given above, or a water soluble salt thereof is then added to the filtration product in amounts sufficient to precipitate the phenoxazonium salt of formula (I), which then is isolated by filtration.

A second pprocess for the production of the compounds of formula (I) comprises reflux heating in an alcoholic medium, such as a lower alkanol, either (a) a salt, such as the hydrochloride or the hydrobromide, of a paranitrosoaniline of formula (II) with a 6-hydroxy phenomorpholine of formula (III), or (b) a paranitrosoaniline of formula (II) with a salt, such as the hydrochloride or the hydrobromide, of a 6-hydroxy phenomorpholine of formula (III). In this alternate process, the nitrosated derivative of formula (II) is generally used in the proportion of 1 to 1.5 moles per mole of compound (III). Generally, the reaction is carried out at ambient pressure. The development of the reaction is followed by chromatography, and once the cyclization is completed, the resulting reaction mixture is filtered hot. In certain cases, the phenoxazonium chloride or bromide crystallizes upon cooling of the filtrate. It is then separated by filtration and transformed, if necessary, into the desired phenoxazonium salt. In the other cases, either an acid having the formula HX where X has the meaning given above or a water-soluble salt thereof is added to the filtrate, diluted or not with water.

The compounds of formula (I) constitute dyes of a remarkable ability for the dyeing of keratinous fibers, in particular human hair. They exhibit great solubility in water and in alcohol, such as lower alkanols and they exhibit great dyeing power within a wide pH range, for instance, from about 4.5 to 1'1.

Consequently, the present invention also relates to a novel dyeing composition for keratinous fibers, in particular human hair, comprising an aqueous solution containing at least one compound of formula (I).

The dyeing compositions according to the invention can contain only the compounds of formula (I), in which case it is found that they impart to white hair shades ranging from blue to green. Advantageously, the application period to achieve such results can be in the order of about three minutes at room temperature, because of the exceptional affinity of the compounds of formula (I) to keratinous fibers. The shades obtained in this manner, which are very luminous, often iridescent, and rich in shimmers or gleams, have the further advantage of masking the red in reddish-brown and auburn hair.

The exceptional affinity of the dyes of this invention for keratinic fibers, together with their excellent solubility in water and alcohols enable these compounds to be incorporated in the compositions according to the invention in extremely small concentrations, which can vary between 0.0005% to 1% in weight and preferably between 0.001 and 0.5% by weight of the composition.

The pH of said compositions generally ranges between about 4.5 and 11 and preferably between 5 and 10.

Further, the compositions according to the invention can also contain other direct dyes, for example, azo dyes, anthraquinone dyes, nitro dyes of the benzene series, indoanilines, indophenols, indamines or other known phenoxazonium salts.

The dyeing compositions according to the invention are generally in the form of aqueous or aqueous alcoholic solution which can be prepared easily by dissolving in water or in a mixture of water and alcohol one or more of the compounds of formula (I), mixed or not mixed with other direct dyes. The compositions can also contain thickeners and be in the form of creams or gels. Generally lower alkanols such as ethanol and isopropanol are used to form the aqueous alcoholic solutions, with the alcohol being present in amounts ranging from about 1 to 50 weight percent of the total dye composition.

Further, the compositions according to the invention can also contain various ingredients normally used in cosmetics, for example, wetting agents, dispersing agents, swelling agents, penetrating agents, emollients or perfumes. They can also be packaged in aerosol cans or containers under pressure using conventional aerosol propellants such as the chlorofluorohydrocarbons including dichlorodifluoromethane, trichloromonofluoromethane and their mixtures.

The dyeing of keratinous fibers, in particular human hair, by means of the dyeing compositions according to the invention, is effected in a conventional manner by applying the composition on the fibers to be dyed, with which it is allowed to remain in contact for a period varying between 3 and 30 minutes, said application being followed by rinsing the fibers and by eventually washing and drying the fibers.

The dyes according to the invention can also be used in the form of capillary hair setting lotions.

Thus the present invention also relates to a hair setting lotion composition comprising an aqueous alcoholic solution containing at least one cosmetic film-forming resin and at least one compound of formula (I).

The proportion of the compound of formula (I) in the hair setting lotions according to the invention can be extremely small. This proportion generally varies between 0.0005% and 1% in weight and preferably between 0.001 and 0.5% by weight of the total composition.

Representative cosmetic film-forming resins which can be used in the hair setting lotion composition of this invention include, for instance, polyvinylpyrrolidone having a molecular weight ranging from about 10,000 to 700,000, the vinyl acetate-crotonic acid copolymers having a molecular weight of about 40,000 to 200,000 wherein the ratio of VA/CA is preferably 90/10; vinylpyrrolidone-vinyl acetate copolymers wherein the ratio of PVP to VA ranges between 30/70 and 70/30 and which have a molecular weight ranging between about 40,000 to 160,000; maleic anhydride-butylvinyl ether copolymers, etc. These resins are used generally in an amount from about 1 to 3% by weight of the total composition.

Representative alcohols suitable for the production of the hair setting lotion compositions of this invention are the low molecular weight alcohols, and preferably ethanol or isopropanol, and they are present generally in amounts ranging from about 20 to 50% by weight of the said composition.

The pH of the hair setting lotion composition can vary between about 4.5–11, and, preferably, between about 5–10.

The hair setting lotion compositions of this invention which contain only dyes of formula (I) constitute tinting compositions which impart extremely luminous glints to the hair and which cover up or mask the red of auburn or reddish-brown hair.

These hair setting lotion compositions can also contain other direct dyes, for example, azo dyes or anthraquinone dyes, nitro dyes of the benzene series, indoanilines, indophenols, indamines or other phenoxazonium salts.

The hair setting lotion compositions of this invention are used in the conventional manner of applying the same to wet hair previously washed and rinsed, followed by rolling up and drying the hair.

The following examples are intended to illustrate the various aspects of the present invention. The temperatures indicated in these examples are expressed in degrees Centigrade and unless otherwise specified, all parts and percentages are by weight.

EXAMPLE 1

4 - methyl 8-diethylamino morpholino-(2,3-b)phenoxazonium perchlorate is prepared as follows:

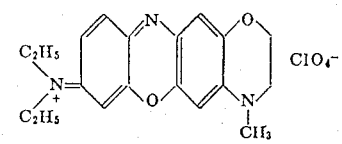

To a dispersion of 0.045 mole (9.65 g.) of paranitroso N,N-diethylaniline hydrochloride in 35 cc. of 96° ethanol, there is added 0.03 mole (4.95 g.) of 4-methyl 6-hydroxy phenomorpholine. The resulting alcoholic solution is reflux heated for 1.5 hours and then hot filtered. To the filtrate there are added 35 cc. of water, and a resulting very light brown insoluble substance is then eliminated by filtering the reaction medium again. After addition of sodium perchlorate to the hydroalcoholic solution, the expected phenoxazonium perchlorate precipitates and is recovered by filtration yielding about 5 grams thereof. After washing the recovered product with a little ice water and then with ethanol, it melts with decomposition at 235°. The product thus obtained is chromatographically pure.

| Analysis, percent | Calculated for $C_{19}H_{22}ClN_3O_6$ | Found | |
|---|---|---|---|
| C | 53.90 | 53.53 | 53.60 |
| H | 5.19 | 5.29 | 5.22 |
| N | 9.90 | 9.77 | 9.71 |

EXAMPLE 2

4-methyl 8 - dibutylamino morpholino-(2,3-b)phenoxazonium perchlorate is prepared as follows:

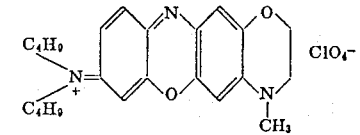

To 35 cc. of absolute ethanol there are added 0.045 mole (12.17 g.) of p-nitroso N,N-dibutylaniline hydrochloride and 0.03 mole (4.95 g.) of 4-methyl 6-hydroxy phenomorpholine. The resulting alcoholic solution is brought to reflux for one hour and a half and then hot filtered. 100 cc. of water are then added to the filtrate and the reaction mixture is again filtered to eliminate a resulting brown insoluble material. After addition of sodium perchlorate to the aqueous alcoholic solution, the expected phenoxazonium perchlorate precipitates and is removed by filtration, yielding about 4.6 g. of the same which, after recrystallization in methanol, melts with decomposition at 181°.

| Analysis, percent | Calculated for $C_{23}H_{30}N_3O_6Cl$ | Found | |
|---|---|---|---|
| C | 57.55 | 57.17 | 57.35 |
| H | 6.27 | 6.18 | 6.15 |
| N | 8.79 | 8.72 | 8.78 |
| Cl | 7.40 | 7.43 | 7.58 |

EXAMPLE 3

4-methyl 8-(β-piperidinoethyl, ethyl)-amino morpholino-2,3-b)phenoxazonium diperchlorate is prepared as follows:

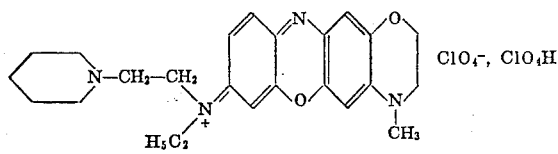

0.045 mole (15 g.) of p-nitroso N,N-(β-piperidinoethyl, ethyl) aniline dihydrochloride and 0.03 mole (4.95 g.) of 4-methyl 6-hydroxy phenomorpholine are added to 60 cc. of 96° ethanol. The resulting alcoholic solution is reflux heated for one hour and hot filtered. Then 150 cc. of water are added to the filtrate. After addition of 70% perchloric acid to the hydroalcoholic solution, the above expected phenoxazonium diperchlorate precipitates and is removed therefrom by filtration, yielding about 8 g. of the same which is then washed with ethanol. The resulting product is chromatographically pure and melts with decomposition at 249°.

| Analysis, percent | Calculated for $C_{24}H_{32}O_{10}N_4Cl_2$ | Found | |
|---|---|---|---|
| C | 47.45 | 47.36 | 47.59 |
| H | 5.27 | 5.42 | 5.34 |
| N | 9.22 | 9.15 | 9.24 |
| Cl | 11.70 | 11.42 | 11.50 |

EXAMPLE 4

4-methyl 8-(β-benzoylaminoethyl, ethyl)-amino morpholino-(2,3-b)phenoxazonium perchlorate is prepared as follows:

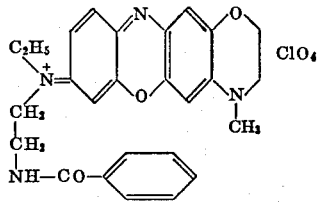

0.03 mole (10 g.) of p-nitroso N,N-(β-benzoylaminoethyl, ethyl) aniline hydrochloride and 0.02 mole (3.3 g.) of 4-methyl 6-hydroxy phenomorpholine are added to 40 cc. of 96° ethanol. The resulting alcoholic solution is heated to reflux for one hour. It is then hot filtered and 100 cc. of water are added to the filtrate. The resulting mixture is then filtered to eliminate a light brown insoluble contained therein. After addition of 70% perchloric acid to the aqueous alcoholic solution, the phenoxazonium perchlorate precipitates and is removed by filtration yielding about 6 g. of the same which is then washed with a little ice water. After crystallization in 50 cc. of 96° ethanol, the product is chromatographically pure and melts with decomposition at 157°.

| Analysis, percent | Calculated for $C_{25}H_{27}O_7N_4Cl$ | Found | |
|---|---|---|---|
| C | 57.51 | 57.12 | 57.20 |
| H | 4.97 | 5.09 | 5.06 |
| N | 10.32 | 10.32 | 10.38 |
| Cl | 6.61 | 6.48 | 6.44 |

EXAMPLE 5

4-methyl 8-di-β-hydroxyethylamino morpholino-(2,3-b)phenoxazonium perchlorate is prepared as follows:

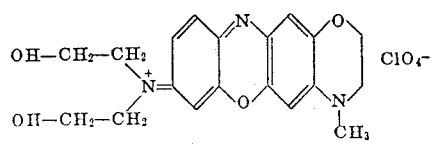

To 60 cc. of 96° ethanol there are added 0.03 mole (7.39 g.) of p-nitroso N,N-di-β-hydroxyethylaniline hydrochloride and 0.02 mole (3.3 g.) of 4-methyl 6-hydroxy phenomorpholine. The resulting solution is heated to reflux for one hour and then cooled. 60 cc. of water and 3 cc. of 70% perchloric acid are then added, thus precipitating the above phenoxazonium perchlorate which is then filtered, yielding about 3.5 g. of the same which melts with decomposition between 263 and 265°. This product is chromatographically pure.

| Analysis, percent | Calculated for $C_{19}H_{22}N_3O_8Cl$ | Found | |
|---|---|---|---|
| C | 50.05 | 50.20 | 50.38 |
| H | 4.82 | 4.97 | 4.92 |
| N | 9.22 | 9.36 | 9.34 |
| Cl | 7.79 | 7.85 | 7.90 |

EXAMPLE 6

4-methyl 8-di-β-hydroxyethylamino morpholino-2,3-b) phenoxazonium chloride is prepared as follows:

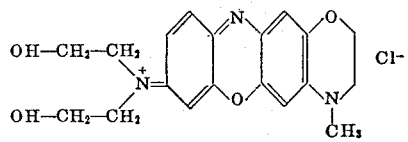

To 25 cc. of absolute ethanol there are added 0.03 mole (7.39 g.) of p-nitroso N,N-di-β-hydroxyethylaminoaniline hydrochloride and 0.02 mole (3.3 g.) of N-methyl 6-hydroxy phenomorpholine. The resulting solution is heated to reflux for one hour, and it is then cooled to −10°. The above phenoxazonium chloride precipitates and is filtered therefrom, yielding about 3.5 g. of the same which, after recrystallization in a dioxane-acetic acid mixture, is chromatographically pure and is in the form of bronze green crystals.

EXAMPLE 7

8-(β-piperidinoethyl, ethyl)-amino morpholino-(2,3-b) phenoxazonium diperchlorate is prepared as follows:

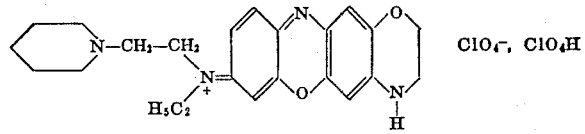

To 50 cc. of absolute alcohol there are added 0.037 mole (12.4 g.) of p-nitroso N,N-(β-piperidinoethyl, ethyl) aniline dihydrochloride and 0.024 mole (3.6 g.) of 6-hydroxy phenomorpholine. The resulting alcoholic solution is heated to reflux for ten minutes, then hot filtered. 120 cc. of water are added to the filtrate. After addition of 70% perchloric acid to the aqueous alcoholic solution, and after cooling, the above diperchlorate precipitates and is filtered therefrom yielding about 8.5 g. of the same which, after recrystallization in a mixture of dimethylformamide and methanol, is chromatographically pure and melts with decomposition between 232 and 234°.

| Analysis, percent | Calculated for $C_{23}H_{30}O_{10}N_4Cl_2$ | Found | |
|---|---|---|---|
| C | 46.54 | 46.86 | 46.73 |
| H | 5.05 | 5.15 | 5.17 |
| N | 9.44 | 9.64 | 9.67 |

EXAMPLE 8

The double chloride of zinc and 4-methyl 8-dibutylamino morpholino-(2,3-b)phenoxazonium is prepared as follows:

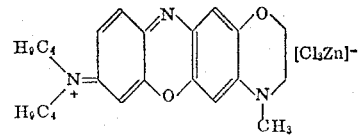

To 40 cc. of ethanol at 96° there are added 0.045 mole (12.17 g.) of p-nitroso N,N-dibutylaniline hydrochloride and 0.03 mole (4.95 g.) of N-methyl 6-hydroxy phenomorpholine. The resulting solution is heated to reflux for one hour and then hot filtered. 100 cc. of water are added to the filtrate which is then filtered to eliminate a light brown insoluble contained therein. Zinc chloride is then added to the aqueous alcoholic solution which is cooled in ice. The above zinc and phenoxazonium double chloride precipitates and is filtered therefrom, washed with a little ice water and recrystallized in ethanol. The product obtained is chromatographically pure and is in the form of bronze crystals.

EXAMPLE 9

An alternate process for the preparation of the 4-methyl 8-diethylamino morpholino-(2,3-b)phenoxazonium perchlorate described in Example 1 is as follows:

To 30 cc. of absolute ethanol, there are added 0.03 mole (5.34 g.) of p-nitroso N,N-diethylaniline, 0.03 mole (4.95 g. of N-methyl 6-hydroxy phenomorpholine and 4.1 g. of anhydrous zinc chloride. The resulting alcohol solution is heated to reflux for one-half hour. It is then cooled and the following double zinc and indamine chloride crystals of formula:

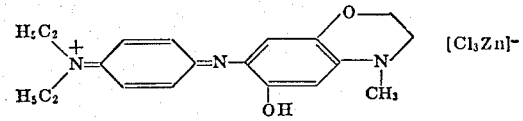

precipitate which are then recovered by filtration, yielding about 11 grams of the same which are then washed with ethanol.

The above salt is then dissolved in 30 cc. of dimethylformamide mixed with 12 cc. of acetic acid. The resulting solution is heated for one-half hour between 130 and 140°. Then 200 cc. of water are added and 3.2 g. of the above zinc salt precipitate and are recovered by filtration. Sodium perchlorate is then added to the filtrate, thus precipitating 2.8 g. of the expected phenoxazonium perchlorate which, after recrystallization in methanol, is chromatographically pure and melts with decomposition at 235°.

EXAMPLE 10

The double chloride of zinc and 4-ethyl 8-dibutylamino morpholino-(2,3-b)phenoxazonium is prepared as follows:

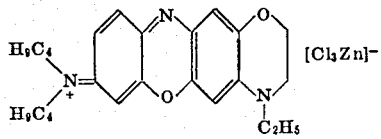

First phase: Preparation of the N-ethyl 6-hydroxy phenomorpholine 1.19 moles (180 g.) of 6-hydroxy phenomorpholine are dissolved in two liters of 1.25N sodium hydroxide solution. This solution is heated to 50–60° C. There are then added to this solution in small amounts, under agitation and simultaneously, by means of two dropping funnels, on the one hand 7.2 moles (580 cc.) of ethyl iodide, and on the other hand 300 cc. of 2N sodium hydroxide solution. These successive additions last for 18 hours, during which the reaction mixture is maintained at approximately 60°.

The reaction mixture is then cooled to 0°. One liter of methylisobutylketone is then added thereto under agitation. 128 g. of N,N-diethyl 6-ethoxy benzomorpholinium iodide which melts at 186° are then isolated by centrifuging the reaction mixture. On the other hand, the methylisobutylketonic phase is separated by decantation from the aqueous sodium hydroxide phase of the filtrate. After washing with water, drying on anhydrous sodium sulfate and dry evaporation, 145 g. of N-ethyl 6-ethoxy phenomorpholine are obtained. (E 0.7 mm. Hg)=122–123°. By dissolving under vacuum the quaternary derivative concurrently obtained (128 g.), an additional 65 grams of N-ethyl 6-ethoxy phenomorpholine are produced.

The 210 g. (1.01 mole) of N-ethyl 6-ethoxy phenomorpholine thus obtained are then transformed into N-ethyl 6-hydroxy phenomorpholine bromohydrate by heating the same to reflux for 6 hours in 600 cc. of hydrobromic acid (d.=1.78). After cooling the reaction medium to −30°, 198 g. of the desired hydrobromide, which melts with decomposition at 155°, are isolated by centrifuge extraction. Molecular weight calculated for $C_{10}H_{13}NO_2 \cdot HBr$: 260. Molecular weight found by potentiometric quantitative analysis in water by means of a 0.1N sodium hydroxide solution: 261.

| Analysis, percent | Calculated for $C_{10}H_{13}NO_2$, HBr | Found | |
|---|---|---|---|
| C | 46.15 | 46.06 | 45.82 |
| H | 5.38 | 5.48 | 5.51 |
| N | 5.38 | 5.35 | 5.33 |

0.021 mole (5.5 g.) of N-ethyl 6-hydroxy phenomorpholine hydrobromide is dissolved in 20 cc. of water. Ammonia (22° Bé.) is added until the solution attains a pH of 7. Then the N-ethyl 6-hydroxy phenomorpholine is extracted by means of benzene. After washing the benzene solution in water and drying on anhydrous sodium sulfate, the solvent is eliminated under vacuum and there is obtained in oily form, 2.90 g. of chromatographically pure N-ethyl 6-hydroxy phenomorpholine. Molecular weight calculated for $C_{10}H_{13}NO_2$: 179. Molecular weight found by potentiometric quantitative analysis in acetic acid by means of perchloric acid: 176.

2nd phase: Preparation of the double chloride of zinc and 4-ethyl 8-dibutylamino morpholino-(2,3-b)phenoxazonium To 30 cc. of absolute ethanol there are added 0.02 mole of N-ethyl 6-hydroxy phenomorpholine (3.58 g.) and 0.03 mole of p-nitroso N,N-dibutylaniline hydrochloride (8.2 g.). The solution is heated to reflux for 30 minutes. It is then hot filtered and 75 cc. of water and a small amount of animal black are added to the filtrate, which is again filtered. Then zinc chloride is added to the cooled filtrate and the double salt of zinc and phenoxazonium which was expected, precipitates and is filtered therefrom and which after recrystallization in ethanol, is chromatographically pure.

EXAMPLE 11

8-N,N-(ethyl-β-piperidinoethyl)-amino morpholino-(2,3-b)phenoxazonium dibromide is prepared as follows:

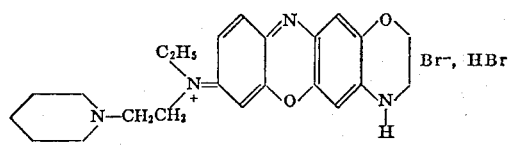

The 18 cc. of absolute ethanol there are added 0.009 mole (3.8 g.) of p-nitroso N,N-(ethyl-β-piperidinoethyl) aniline dihydrobromide and 0.006 mole (0.905 g.) of 6-hydroxy phenomorpholine. The resulting solution is heated to reflux for one-half hour. The expected morpholinophenoxazonium dibromide precipitates and is centrifuged therefrom, yielding about 1.3 g. of the same which after recrystallization in a water-ethanol solution at 50%, is chromatographically pure.

| Analysis, percent | Calculated for $C_{23}H_{30}N_4O_2Br_2$ | Found | |
|---|---|---|---|
| C | 49.81 | 49.78 | 49.88 |
| H | 5.41 | 5.43 | 5.47 |
| N | 10.10 | 9.97 | 9.99 |

EXAMPLE 12

4-ethyl-8-N-(ethyl - β - piperidinoethyl)-amino morpholino - (2,3-b)phenoxazonium dibromide is prepared as follows:

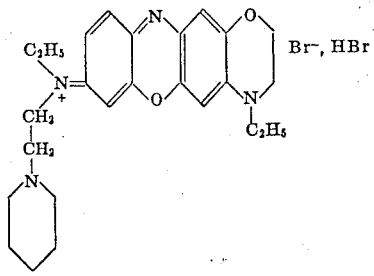

To 15 cc. of absolute ethanol there are added 0.0066 mole (2.79 g.) of p-nitroso N,N-(ethyl-β-piperidinoethyl) aniline dihydrobromide and 0.0044 mole (0.8 g.) of N-4-ethyl 6-hydroxy phenomorpholine. The reaction medium is heated to reflux for one-half hour. Then the expected morpholine phenoxazonium dibromide precipitates and is filtered therefrom, yielding about 0.9 g. of the same which is then washed with ethanol. After recrystallization in a 60% ethanol-water solution, the above product is found to be chromatographically pure.

| Analysis, percent | Calculated for $C_{25}H_{34}N_4O_2Br_2$ | Found | |
|---|---|---|---|
| C | 31.55 | 51.25 | 51.17 |
| H | 5.84 | 5.75 | 5.82 |
| N | 9.62 | 9.50 | 9.61 |

EXAMPLE 13

4-ethyl 8-(carbamylmethyl, ethyl-amino-(2,3-b)phenoxazonium dibromide is prepared as follows:

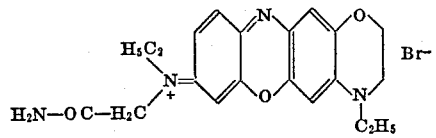

0.0073 mole (1.5 g.) of p-nitroso N,N-(carbamyl methyl, ethyl) aniline and 0.005 mole (1.3 g.) of 4-ethyl 6-hydroxy phenomorpholine hydrobromide are added to 15 cc. of absolute ethanol. The alcoholic solution is heated to reflux for 30 minutes. After cooling and addition of 15 cc. of ethyl acetate, the above phenoxazonium bromide precipitates and is filtered therefrom. The said product melts with decomposition at 195°.

| Analysis, percent | Calculated for $C_{20}H_{23}N_4O_3Br$ | Found | |
|---|---|---|---|
| C | 53.69 | 52.97 | 53.21 |
| H | 5.14 | 4.98 | 5.00 |
| N | 12.53 | 12.53 | 12.71 |

EXAMPLE 14

The following hair dye composition is prepared:

| | G. |
|---|---|
| Dye of Example 1 | 0.05 |
| Water, q.s.p. 100 g. | |
| Ammonia at 22° Bé., q.s.p. pH 10. | |

This hair dye composition is applied to 95% naturally white hair for 10 minutes at ambient temperature and imparts thereto after rinsing and shampooing a strong emerald green color.

EXAMPLE 15

A hair dye composition is prepared as follows:

| | G. |
|---|---|
| Dye of Example 1 | 0.001 |
| Ethyl alcohol, at 96° | 20 |
| Water, q.s.p. 100 g. | |
| Ammonia, q.s.p. pH 10. | |

This hair dye composition is applied to discolored or bleached hair for 10 minutes at ambient temperature and imparts thereto, after rinsing and shampooing, a light emerald-green coloration with iridescent glints.

EXAMPLE 16

A hair setting lotion composition is prepared as follows:

| | G. |
|---|---|
| Dye of Example 1 | 0.1 |
| Crotonic acid-vinyl acetate copolymer (90% vinyl acetate, 10% crotonic acid, molecular weight 45,000 to 50,000) | 2 |
| Ethyl alcohol, at 96° | 50 |
| Water, q.s.p. 100 g. | |
| Triethanolamine, q.s.p. pH 7. | |

This hair setting lotion composition is applied to bleached hair and imparts thereto a very intense and very luminous blue-green color.

EXAMPLE 17

The following hair dye composition is prepared:

| | G. |
|---|---|
| Dye of Example 1 | 0.5 |
| Ethyl alcohol, at 96° | 40 |
| Water, q.s.p. 100 g. | |
| 1% aqueous lactic acid, q.s.p. pH 4.5. | |

This hair dye composition is applied to hair which is 95% naturally white. After a period of about 5 minutes, the thus treated hair is rinsed and shampooed and the color obtained is a very slightly blueish green with silver glints.

EXAMPLE 18

A hair setting lotion is prepared as follows:

| | G. |
|---|---|
| Dye of Example 1 | 0.01 |
| N-[(2',4'-diamino 5'-methoxy) phenyl] benzoquinone imine | 0.25 |
| Vinyl acetate-crotonic acid copolymer (vinyl acetate 90%, crotonic acid 10% — molecular weight 45,000 to 50,000) | 2 |
| Ethyl alcohol, at 96° | 50 |
| Water, q.s.p. 100 g. | |
| Triethanolamine, q.s.p. pH 7. | |

This hair setting lotion is applied to bleached hair and imparts thereto an iridescent purple-chestnut coloring.

EXAMPLE 19

The hair setting lotion composition is prepared:

| | G. |
|---|---|
| Dye of Example 1 | 0.2 |
| Vinyl acetate-crotonic acid copolymer (vinyl acetate 90%, crotonic acid 10%—molecular weight 45,000 to 50,000) | 2 |
| Ethyl alcohol, at 96° | 50 |
| Water, q.s.p. 100 g. | |
| Triethanolamine, q.s.p. pH 7. | |

This hair setting lotion is applied to light brown hair and imparts thereto a dark tobacco-brown color with green glints.

EXAMPLE 20

A hair setting lotion is prepared as follows:

| | G. |
|---|---|
| Dye of Example 1 | 0.05 |
| N-[4'-hydroxy) phenyl] 3-amino 6-methyl benzoquinone imine | 0.3 |
| Vinyl acetate-crotonic acid copolymer (vinyl acetate 90%, crotonic acid 10%—molecular weight 45,000 to 50,000) | 2 |
| Ethyl alcohol at 96° | 50 |
| Water, q.s.p. 100 g. | |
| Triethanolamine, q.s.p. pH 7. | |

This hair setting lotion is applied to hair which is 95% naturally white and imparts thereto a light bronze color with golden glints.

EXAMPLE 21

The following hair dye composition is prepared:

| | G. |
|---|---|
| Dye of Example 1 | 0.25 |
| Butylglycol | 5 |
| Lauryl alcohol oxyethylenated with 10.5 moles of ethylene oxide | 5 |
| Water, q.s.p. 100 g. | |

This hair dye composition is applied to 60% white hair and imparts thereto after a 20-minute contact period, followed by rinsing and shampooing, a malachite green color with a watered silk or "moire" effect.

EXAMPLE 22

A hair dye composition is prepared as follows:

| | G. |
|---|---|
| Dye of Example 2 | 0.05 |
| Ethyl alcohol, 96° | 20 |
| Water, q.s.p. 100 g. | |
| Ammonia (22° Bé.), q.s.p. pH 10. | |

This hair dye composition is applied to 95% naturally white hair, and imparts thereto after a 10-minute contact period, followed by rinsing and shampooing, a very luminous peacock-blue color.

EXAMPLE 23

The following hair setting lotion is prepared:

| | G. |
|---|---|
| Dye of Example 2 | 0.02 |
| N-[(4'-amino) phenyl] 3-amino 6-methyl benzoquinone imine | 0.15 |
| Vinyl acetate-crotonic acid copolymer (vinyl acetate 90%, crotonic acid 10%—molecular weight 45,000 to 50,000) | 2 |
| Isopropanol alcohol | 50 |
| Water, q.s.p. 100 g. | |
| Triethanolamine, q.s.p. pH 7. | |

This hair setting lotion composition is applied to bleached hair and imparts thereto a very light violet tinge.

EXAMPLE 24

A hair dye composition is prepared as follows:

| | G. |
|---|---|
| Dye of Example 3 | 0.1 |
| Ethyl alcohol, at 96° | 20 |
| Water, q.s.p. 100 g. | |
| Ammonia (22° Bé.), q.s.p. pH 10. | |

This hair dye composition is applied to 95% naturally white hair and imparts thereto after a 10-minute contact period, followed by rinsing and shampooing, a very luminous turquoise color.

EXAMPLE 25

The following hair dye composition is prepared:

| | G. |
|---|---|
| Dye of Example 2 | 0.04 |
| Nitroparaphenylenediamine | 0.25 |
| Ethyl alcohol, at 96° | 20 |
| Water, q.s.p. 100 g. | |
| Ammonia (22° Bé.), q.s.p. pH 10. | |

This hair dye composition is applied to 95% naturally white hair and imparts thereto after a 20-minute contact period at normal temperature, followed by rinsing and shampooing, a dark blue-grey color.

EXAMPLE 26

A hair dye composition is prepared as follows:

| | G. |
|---|---|
| Dye of Example 3 | 0.1 |
| [(2',4'-diamino-5'-methoxy) phenyl] benzoquinone imine | 0.25 |
| Ethyl alcohol, at 96° | 25 |
| Water, q.s.p. 100 g. | |
| Ammonia (22° Bé.), q.s.p. pH 10. | |

This hair dye composition is applied to 95% naturally white hair and imparts thereto after a 15-minute contact period, followed by rinsing and shampooing, a pearly pink beige color.

EXAMPLE 27

The following hair setting lotion composition is prepared:

| | G. |
|---|---|
| Dye of Example 3 | 0.01 |
| [(3',5' - dimethyl 4'-hydroxy) phenyl] 2,6-dimethyl benzoquinone imine | 0.05 |
| Vinyl acetate-crotonic acid copolymer (crotonic acid 10%, vinyl acetate 90%—molecular weight 45,000 to 50,000) | 2 |
| Ethyl alcohol, at 96° | 50 |
| Water, q.s.p. 100 g. | |
| Triethanolamine, q.s.p. pH 7. | |

This hair setting lotion is applied to bleached hair and imparts thereto a cornflower-blue color.

EXAMPLE 28

A hair dye composition is prepared as follows:

| | G. |
|---|---|
| Dye of Example 3 | 0.025 |
| Nitroparaphenylenediamine | 0.25 |
| Ethyl alcohol, 96° | 40 |
| Water, q.s.p. 100 g. | |
| Ammonia (22° Bé.), q.s.p. pH 10. | |

This hair dye composition is applied to 95% naturally white hair and imparts thereto after a 10-minute contact period at normal temperature, followed by a rinse and a shampoo, a very luminous vivid yellow-green coloration.

EXAMPLE 29

The following hair setting lotion composition is prepared:

| | G. |
|---|---|
| Dye of Example 4 | 0.05 |
| Vinyl acetate-crotonic acid copolymer (crotonic acid 10%, vinyl acetate 90%—molecular weight 45,000 to 50,000) | 2 |
| Isopropyl alcohol | 50 |
| Water, q.s.p. 100 g. | |
| Triethanolamine, q.s.p. pH 7. | |

This hair setting lotion is applied to bleached hair and imparts thereto a very luminous turquoise-blue color.

EXAMPLE 30

A hair dye composition is prepared as follows:

| | G. |
|---|---|
| Dye of Example 4 | 0.025 |
| N-(β-aminoethyl) 1-amino 3-nitro 4-amino benzene hydrobromide | 0.25 |
| Ethyl alcohol, 96° | 20 |
| Water, q.s.p. 100 g. | |
| Ammonia (22° Bé.), q.s.p. pH 10. | |

This hair dye composition is applied to 60% naturally white hair, with which it is allowed to remain in contact for 20 minutes. After rinsing and shampooing, the color obtained is very dark purplish chestnut-brown.

EXAMPLE 31

The following hair dye composition is prepared:

|  | G. |
|---|---|
| Dye of Example 6 | 0.001 |
| Water, q.s.p. 100 g. | |
| Ammonia (22° Bé.), q.s.p. pH 10. | |

This hair dye composition is applied to bleached hair and imparts thereto after a 3-minute contact period at normal temperature, followed by rinsing and shampooing, a pearly light-green color.

EXAMPLE 32

A hair setting lotion composition is prepared as follows:

|  | G. |
|---|---|
| Dye of Example 5 | 0.1 |
| Vinyl acetate-crotonic acid copolymer (as in Example 29) | 2 |
| Ethyl alcohol, 96° | 50 |
| Water, q.s.p. 100 g. | |
| Triethanolamine, q.s.p. pH 7. | |

This hair setting lotion is applied to bleached hair and imparts thereto a very luminous lively blue color.

EXAMPLE 33

The following hair dye composition is prepared:

|  | G. |
|---|---|
| Dye of Example 7 | 0.075 |
| Ethyl alcohol, 96° | 20 |
| Water, q.s.p. 100 g. | |
| Aqueous lactic acid solution (1%), q.s.p. pH 5. | |

This hair dye composition is applied to 95% naturally white hair and imparts thereto after a 20 minute contact period at ambient temperature and, after rinsing and shampooing, a silvery grey-green color.

EXAMPLE 34

A hair dye composition is prepared as follows:

|  | G. |
|---|---|
| Dye of Example 8 | 0.15 |
| Ethyl alcohol, 96° | 20 |
| Water, q.s.p. 100 g. | |

This hair dye composition is applied to 95% naturally white hair and imparts thereto after a contact period of 20 minutes at ambient temperature and, after rinsing and shampooing, a deep emerald-green color.

EXAMPLE 35

The following hair setting lotion composition is prepared:

|  | G. |
|---|---|
| Dye of Example 10 | 0.1 |
| Crotonic acid-vinyl acetate copolymer (as in Example 29) | 2 |
| Ethyl alcohol, 96° | 50 |
| Water, q.s.p. 100 g. | |
| Triethanolamine, q.s.p. pH 7. | |

This hair setting lotion is applied to bleached hair and imparts thereto an emerald-green color.

EXAMPLE 36

A hair setting lotion is prepared as follows:

|  | G. |
|---|---|
| Dye of Example 11 | 0.05 |
| Vinyl acetate-crotonic acid copolymer (vinyl acetate 90%, crotonic acid 10%—molecular weight 45,000 to 50,000) | 2 |
| Ethyl alcohol, 96°, q.s.p. 50°. | |
| Water, q.s.p. 100 g. | |
| Triethanolamine, q.s.p. pH 7. | |

This hair setting lotion is applied to bleached hair and imparts thereto a pearly blue color.

EXAMPLE 37

The following hair dye composition is prepared:

|  | G. |
|---|---|
| Dye of Example 12 | 0.2 |
| Water, q.s.p. 100 g. | |
| Ammonia (22° Bé.), q.s.p. pH 9. | |

This hair dye composition is applied to 95% naturally white hair and after a 10 minute contact period at room temperature, imparts thereto, after rinsing and shampooing, a very luminous blue color.

EXAMPLE 38

A hair setting lotion is prepared as follows:

|  | G. |
|---|---|
| Dye of Example 12 | 0.005 |
| Vinyl acetate-crotonic acid copolymer (vinyl acetate 90%, crotonic acid 10%—molecular weight 45,000 to 50,000) | 2 |
| Ethyl alcohol, 96°, q.s.p. 50°. | |
| Water, q.s.p. 100 g. | |
| Triethanolamine, q.s.p. pH 7. | |

This hair setting lotion is applied to bleached hair and imparts thereto a pearly appearance with pale green glints.

EXAMPLE 39

The following hair setting lotion is prepared as follows:

|  | G. |
|---|---|
| Dye of Example 13 | 0.025 |
| Vinyl acetate-crotonic acid copolymer (vinyl acetate 90%, crotonic acid 10%—molecular weight 45,000 to 50,000) | 2 |
| Ethyl alcohol, 96°, q.s.p. 50°. | |
| Water, q.s.p. 100 g. | |
| Triethanolamine, q.s.p. pH 7. | |

This hair setting lotion is applied to bleached hair and imparts thereto a pearly pale-green color.

What is claimed is:

1. A hair dyeing composition comprising an aqueous solution of a phenoxazonium salt of the formula

[structural formula of phenoxazonium salt with positions numbered 1-12, substituents $R_1$, $R_2$, $R_3$ and counterion $X^-$]

wherein $R_1$ is selected from the group consisting of hydrogen and lower alkyl having 1-4 carbon atoms, $R_2$ and $R_3$ each independently are selected from the group consisting of alkyl having 1-4 carbon atoms, hydroxyalkyl having 1-4 carbon atoms, carbamylalkyl having 1-4 carbon atoms, ω-aminoalkyl having 1-4 carbon atoms wherein the amino moiety is acylated with a monocarboxylic organic acid having the formula R′—COOH wherein R′ is phenyl, or ω-aminoalkyl wherein the alkyl moiety has 1-4 carbon atoms and wherein the nitrogen of the amino moiety is included in piperidinyl, and X is selected from the group consisting of Cl, Br, $ClO_4$ and $Cl_3Zn$ or the tautomeric forms thereof, said phenoxazonium salt being present in amounts of 0.0005–1% by weight of said composition.

2. The composition of claim 1, containing from 0.001 to 0.5% by weight of said phenoxazonium salt.

3. The composition of claim 1, having a pH between 4.5 and 11.

4. The composition of claim 3, having a pH between 5 and 10.

5. The composition of claim 1 which also includes another direct dye selected from the group consisting of a nitrobenzene dye, an indoaniline dye, an indophenol dye, and an indamine dye.

6. A process for the dyeing of human hair, comprising impregnating said hair with the composition of claim 1 in amounts effective to dye said hair and permitting said composition to remain in contact with said hair for a perod of time ranging between 3-30 minutes, rinsing and shampooing said hair and drying said hair.

7. A hair setting lotion composition comprising an aqueous alcoholic solution of a cosmetic film forming resin selected from the group consisting of polyvinylpyrrolidone having a molecular weight ranging from about 10,000 to 700,000, vinylacetate-crotonic acid copolymer having a molecular weight of about 40,000 to 200,000 wherein the ratio of VA/CA is 90/10; and vinylpyrrolidone-vinyl acetate copolymer having a molecular weight of about 40,000 to 160,000 wherein the ratio of PVP to VA ranges between 30/70 and 70/30, and a phenoxazonium salt having the formula

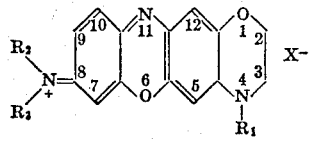

wherein $R_1$ is selected from the group consisting of hydrogen and lower alkyl having 1-4 carbon atoms, $R_2$ and $R_3$ each independently are selected from the group consisting of alkyl having 1-4 carbon atoms, hydroxyalkyl having 1-4 carbon atoms, carbamylalkyl having 1-4 carbon atoms, ω-aminoalkyl having 1-4 carbon atoms wherein the amino moiety is acylated with a monocarboxylic organic acid having the formula R'—COOH wherein R' is phenyl, or ω-aminoalkyl wherein the alkyl moiety has 1-4 carbon atoms and wherein the nitrogen of the amino moiety is included in piperidinyl and X is selected from the group consisting of Cl, Br, $ClO_4$ and $Cl_3Zn$ or the tautomeric forms thereof, said phenoxazonium salt being present in amounts of 0.0005-1% by weight of said composition and said resin being present in amounts of 1-3% by weight of said composition.

8. The composition of claim 7 containing from 0.001 to 0.5% by weight of said phenoxazonium salt.

9. The composition of claim 7 having a pH between 4.5 and 11.

10. The composition of claim 7, wherein the alcohol is a low molecular weight alcohol.

11. The composition of claim 10, wherein said alcohol is selected from the group consisting of ethanol and isopropanol.

12. The composition of claim 7, containing from 20 to 50% by weight of alcohol.

References Cited
UNITED STATES PATENTS
3,107,243   10/1963   Pugin et al. _____ 260—246 R
3,690,810   9/1972   Bugaut et al. _____ 8—10.2

ALBERT T. MEYERS, Primary Examiner

V. C. CLARKE, Assistant Examiner

U.S. Cl. X.R.

8—10.1; 260—244 R, 246 R; 424—Digest 1 and 2, 77